Patented Feb. 28, 1939

2,148,642

UNITED STATES PATENT OFFICE 2,148,642

PROCESS FOR THE MANUFACTURE OF MOLDS AND CORES FOR CASTINGS

René François Jules Ricard, Pontault-Combault, France

No Drawing. Application December 7, 1937, Serial No. 178,520. In France December 8, 1936

3 Claims. (Cl. 22—188)

To enhance the mechanical strength of the molds and cores needed in the metal foundries and substantially made from sand, binding agents of most varying kinds are used, of which hitherto cheap substances such as sulphite waste lye, molasses, linseed oil, combinations of oils with resins and the like have reached some practical importance. But when increasing the strength of molding sand masses with binders one must take care, not to interfere with the permeability of the molds and cores and to retain a certain minimum of heat conductivity. For when casting a metal a fusion of the sand or of the silicious earths of the latter may begin, whereby the surface of the metal casts becomes incrusted and turns dull and dim. To avoid this disadvantage the heat must be carried off as quickly as possible into the masses of the mold and core. With the methods used hitherto for the manufacture of cores there was only the tendency to bind the molding sand as strongly as possible without intending to improve simultaneously the heat conductivity of the cores. But to attain this latter result it would not be sufficient to add any substance of good thermal conductivity to the molding sand, such as graphite or lamp black, since the individual particles of these substances would not combine with enough permanence.

By the present invention the thermal conductivity of the molding sand is improved by adding heat conducting substances such as graphite and that in combination with suitable binders, whereby a continuous network or skeleton of good thermal conductivity is formed between the sand grains. Preferably this is obtained by admixing the graphite or the like to the sand not in a pulverous state but in the form of a paste or the like and kneading intensively during said mixing. The thus obtained molds and cores excel not only by a good thermal conductivity but also by a particular mechanical stability and a good permeability.

As binders for the graphite paste natural and synthetic resins may be used, such as a balm, colophony, copal, tall-oil, sulphite waste lye or alkyd resins phenol-formaldehyde- and urea-resins of any kind, or mixtures thereof. Preferably such resinous substances may be used for this purpose as already show a large binding power when applied in relatively small amounts. Also all sufficiently viscous varnish-like products, such as varnishes, oil varnishes, alkyd resin varnishes and the like may be used, if desired blended with said natural or synthetic resins. The choice depends both on the shape of the required casting and on the kind of the metal or alloy to be cast. Thus for special steel qualities it is suitable to use certain hardenable phenol resins, for instance such as are prepared according to the German Patent 605,917 and modifications of the process there described, and which lead, when hardened, to particularly strong, tenacious and heat resistant resins. These synthetic resins are obtained from hardenable phenol aldehyde condensation products by treating them at temperatures above 70° C. with such a quantity of a mono-alcohol boiling over 80° C. that at least one molecule of said alcohol is employed for each of the methylol groups contained in the said condensation product, higher oxy fatty acids or their glycerides, other fatty oils, neutral resins or mixed esters of poly alcohols with di-carbonic acids and fatty or resin acids separately or in mixture being added at the same time or afterwards, and said heating being continued until a product is obtained which is yet soluble in organic solvents. Before heating the said hardenable phenol aldehyde condensation products with the said mono-alcohols the phenolic hydroxyl groups of the said condensation products employed may be alkoxylated by means of mono- or poly-alcohols. Resins of these kinds are specially useful for the manufacture of the molds and cores of such castings which are difficultly to be cast. But when metals with lower melting points and smaller specific heat are founded, it suffices to use resinous binders which are decomposed easier by heat. In this case it is often of advantage to emulsify the binder with a volatile liquid to give more body to the sand during molding.

Furthermore it has been stated that the new process is permitting to use a less pure sand and that it is unnecessary to take so much regard to the condition of the grain than otherwise. Furthermore there is no more need to strike off large molds as long as they are still red-hot.

The new process is applicable for the manufacture of molds and cores from dry or green sand for casting common and special steels, iron and cast metals, non-ferrous metals and alloys thereof.

Examples (1) A mass for troweling to be used in the preparation of molds in order to improve the appearance of the metal castings may be made as follows:

The metallic cooling parts and the interior of the molds consisting of green or baked sand or of such sand as is bound by cement are provided with a troweling mass prepared from 1 part of a hardenable phenol resin as obtained according to a modification of the process of the German Patent 605,917, 1.5 parts of synthetic graphite, 0.02 part of lead-cobalt-manganese resinate and, depending on the porosity, 3–6 parts of a mixture of puzzolane or mica with finely powdered silicious or argillaceous earth. To dilute, monochlorbenzol or any other solvent of the benzol series depending on the kind of applying the mass is added. Casting is executed only after the solvent is completely evaporated and the cover of troweling mass is thoroughly dried.

(2) Preparation of cores for the metal foundry:

3–6 parts of finely powdered synthetic graphite are kneaded intimately with 3–5 parts of a hardenable phenol resin prepared according to the process of the German Patent 605,917. Thereupon 92 parts of dry sand are added and the whole is kneaded until an intimate mixture is obtained. The thus prepared mass is well moldable and is also suited for the mechanical manufacture of molds and cores. It is baked at 160–220° C. until complete and thorough hardening is reached. Casting proceeds normally, the metal does not rise and the obtained casts are perfectly sharp-edged, of good surface and without cracks or blow-holes. The removal of the sand and of the filling is remarkably easy.

This method is of special advantage for the manufacture of small cores for castings from nickel-aluminium-steel and from inoxidisable or manganese steel, furthermore of cores for pump bodies and pipes, where under all circumstances any cracking must be prevented. It is suited for the manufacture of both thin and thick pipes, and the like. Bronze cocks may be manufactured without refuses or formation of pores. Generally spoken, it is possible to cast the most difficult castings at very high temperatures with the metals and alloys most difficultly to be treated.

(3) Heavily thickened linseed oil of the kind of a varnish as used commonly for the manufacture of printing inks is intimately kneaded with natural graphite rich in carbon in the proportion 1:2. With the paste obtained ninefold the quantity by weight of very fine silicious sand is bound. The resulting mixture gives a means to produce faultless sharp-edged casts of fine surface. The filling may easily be removed from the cast pieces. It is recommendable to apply strengthenings or stiffenings or the like to keep the sand in the mold bound by this method, whereas no such strengthenings or the like are required when the method according to Example 2 is employed.

(4) The varnish of the preceding example is replaced by the following lacquer-body: 1 part of a pure oil soluble phenol resin as prepared for instance from alkyl phenols and formaldehyde in known manner, is dissolved in 1.5–3 parts of wood oil at 150° C. and boiled, if necessary, at 240° C. By means of this lacquer-body the baking time of the molds and cores may be reduced considerably. It is even possible to cast without previous baking by adding about 2% of the weight of the oil, of a drier such as powdered manganese dioxide or still better of a dissolved drier and keeping the molds before casting for 2–3 days at room temperature.

(5) In the mixture of Example 4 the alkyl phenol resin is replaced by the hardenable phenol resin employed in Example 1. Molds made with this binder are specially resistant against metals tending to badly damage the mold. Consequently castings with better surface are obtained here.

(6) For casting low melting metals, light metals and light alloys, such as magnesium, the cores and molds may be provided with the following mass, or simply their surface coming in contact with the pattern may be coated with this mass, which may be applied on a cheaper sand base bound with cement, sodium silicate or any other adhesive.

An emulsion of 1.5 parts of an alkyd resin modified by linseed oil fatty acids, 0.5 parts of such a hardenable phenol resin as mentioned in Example 2, 0.05 part of ammonium sulphoricinoleate and 2 parts of water are triturated to a paste with 3.5 parts of finely powdered graphite, 0.25 part of ammonium fluoride and 2.25 parts of sulphur. The sand composed as indicated in the following is bound in a mill or any other mixing machine with the said paste. The employed sand mixture consists of 72 parts of a dry silicious sand and 18 parts of a dry argillaceous or loamy sand. The mixing of the molding mass may be much promoted by the addition of water.

To facilitate the loosening of the core from the casting after founding, dispersing substances such as wood flour or diatomaceous earth are added to the core. If readily oxidisable metals or alloys are to be cast, it is advisable to add a solution of ammonium fluoride or of a similar reducing substance to the mixture of sand and binder. The cores and molds are baked preferably at 160–200° C.

Since the sand composition described in this example exerts a cooling effect on the cast metal, it is possible in many cases to do away with the metal pieces put otherwise into the exposed parts of the molds or cores by way of precaution to obtain such a cooling.

Having now particularly described and ascertained the nature of my said invention, I declare that what I claim is:—

1. A process for the manufacture of molds and cores for casting metals, which comprises mixing a heat conducting carbonaceous material in a finely divided state with foundry sand and hardenable synthetic resin, molding the mixture thus obtained and drying it.

2. A process for the manufacture of molds and cores for casting metals, which comprises mixing graphite with foundry sand and a hardenable synthetic phenol resin of the kind obtained by treating at temperatures above 70° C. a hardenable phenol aldehyde condensation product with such a quantity of a monohydric alcohol boiling above 80° C. that at least one molecule of said monohydric alcohol is present for each of the methylol groups contained in said condensation product, and with compounds containing higher oxy fatty acids; then molding the obtained mixture of graphite foundry sand and of said hardenable synthetic phenol resin, and drying it.

3. A mold, core or the like for casting metals consisting of a mixture of foundry sand, finely divided, heat conducting, carbonaceous material and a hardenable synthetic resin.

RENÉ FRANÇOIS JULES RICARD.